United States Patent [19]
Joshi et al.

[11] Patent Number: 5,823,769
[45] Date of Patent: Oct. 20, 1998

[54] IN-LINE METHOD OF BURNER FIRING AND $NO_x$ EMISSION CONTROL FOR GLASS MELTING

[75] Inventors: Mahendra L. Joshi, Altamonte Springs; Patrick J. Mohr, Mims, both of Fla.

[73] Assignee: Combustion Tec, Inc., Apopka, Fla.

[21] Appl. No.: 622,014

[22] Filed: Mar. 26, 1996

[51] Int. Cl.$^6$ .................................................. F27D 17/00
[52] U.S. Cl. ........................ 432/181; 432/179; 432/180
[58] Field of Search .................................. 432/179, 180, 432/181

[56] References Cited

U.S. PATENT DOCUMENTS

| | | | |
|---|---|---|---|
| 1,606,927 | 11/1926 | Dyrssen | 432/181 |
| 2,040,472 | 5/1936 | Edgar | 432/181 |
| 2,133,654 | 10/1938 | Brink | 432/181 |
| 2,152,808 | 4/1939 | Kutchka | 432/181 |
| 2,300,426 | 11/1942 | Longenecker | 432/181 |
| 2,491,705 | 2/1949 | Bloom | 432/181 |
| 2,685,439 | 8/1954 | Bartu et al. | 432/181 |
| 2,704,660 | 3/1955 | Bartu | 432/181 |
| 3,100,461 | 8/1963 | Werner . | |
| 3,515,529 | 6/1970 | Love et al. . | |
| 3,656,878 | 4/1972 | Wright . | |
| 3,890,084 | 6/1975 | Voorheis et al. . | |
| 4,210,411 | 7/1980 | Ward et al. . | |
| 4,313,722 | 2/1982 | Yigdall . | |
| 4,347,072 | 8/1982 | Nagaoka et al. . | |
| 4,375,235 | 3/1983 | Tsai | 432/181 |
| 4,403,941 | 9/1983 | Okiura et al. . | |
| 4,496,315 | 1/1985 | Savolskis | 432/181 |
| 4,496,316 | 1/1985 | Tsai | 432/181 |
| 4,599,100 | 7/1986 | Demarest, Jr. . | |
| 4,666,397 | 5/1987 | Wenning et al. . | |
| 4,874,311 | 10/1989 | Gitman | 432/181 |
| 4,907,963 | 3/1990 | Neff . | |
| 5,139,755 | 8/1992 | Seeker et al. . | |
| 5,203,859 | 4/1993 | Khinkis et al. . | |
| 5,209,893 | 5/1993 | Askin et al. . | |

FOREIGN PATENT DOCUMENTS

| | | |
|---|---|---|
| 0293168 | 11/1988 | European Pat. Off. . |
| 0333239 | 9/1989 | European Pat. Off. . |
| 0573300 | 12/1993 | European Pat. Off. . |
| 58-60111 | 4/1983 | Japan . |
| 2083608 | 3/1982 | United Kingdom . |

*Primary Examiner*—Henry A. Bennett
*Assistant Examiner*—Jiping Lu
*Attorney, Agent, or Firm*—Speckman, Pauley & Fejer

[57] ABSTRACT

A process and apparatus for combustion of a fuel and oxidant in which a first portion of a fuel is mixed with an oxidant to form a fuel-lean fuel/oxidant mixture in a fuel-lean combustion zone. The remaining portion of fuel is mixed with the fuel-lean fuel/oxidant mixture downstream of the fuel-lean combustion zone, forming a substantially stoichiometric fuel/oxidant mixture. The stoichiometric fuel/oxidant mixture is ignited, forming a primary flame having high luminosity and low $NO_x$ emissions.

8 Claims, 8 Drawing Sheets

IN-LINE METHOD OF BURNER FIRING AND $NO_x$ EMISSION CONTROL FOR GLASS MELTING

BACKGROUND OF THE INVENTION

1. Field of the Invention

This invention relates to a process and apparatus for staged fuel combustion in connection with regenerative industrial furnaces, such as glass melting furnaces.

2. Description of Prior Art

An issue frequently encountered in connection with regenerative type industrial furnaces, such as regenerative glass melting furnaces, is the use of proper firing methods to fire fuel, that is, the burner firing method relative to combustion air port design. A properly selected firing method should provide the required flame length and shape for molten material coverage, uniform heat distribution, and low $NO_x$ emissions. Control of flame length and shape and uniform heat distribution are readily achieved by traditional firing methods, such as underport firing, side-of-port firing, overport firing, and throughport firing. The furnace and port design governs the method of fuel firing as well as the type of fuel utilized, that is, fuel oil or natural gas. However, maintaining $NO_x$ emissions at low levels using such traditional firing methods is not readily attainable, except when such traditional firing methods are combined with other $NO_x$ abatement technologies, such as ammonia injection which involves injection of a nitrogen-containing reagent, such as ammonia, into the high temperature combustion products, usually into the exhaust side of the regenerator checkers, in a narrow temperature window. $NH_2$ produced by decomposition of the nitrogen-containing agent, reacts with NO to reduce it to $N_2$. Ammonia injection typically reduces $NO_x$ by about 40%, but performance is limited by access to the exhaust gas region within the required narrow temperature window and $NH_3$ slip.

U.S. Pat. No. 5,203,859 teaches another $NO_x$ abatement technology, namely oxygen-enriched air staging in which an oxygen-deficient primary flame, which inhibits $NO_x$ formation, and at the same time, custom engineered oxygendriven ejectors installed at strategic locations in the furnace breastwall, provide oxygen-enriched air streams to effectively burn any unburned hydrocarbons and carbon monoxide within the furnace. Typically, $NO_x$ reduction can anywhere from 50 to 75%.

U.S. Pat. No. 5,139,755 and U.S. Pat. No. 4,347,072 teach another $NO_x$ abatement technique, gas reburn. Gas reburn involves injection of natural gas into the furnace downstream of the conventional burners. The natural gas produces a fuel-rich combustion zone where $NO_x$ is reduced to $N_2$ by hydrocarbon fragments. In addition, combustion air is added to burn out the combustibles. Under typical furnace conditions, gas reburn reduces $NO_x$ emissions by about 75%.

Yet another $NO_x$ abatement technology, oxy-fuel firing, is taught by U.S. Pat. No. 5,199,866. The main focus of this concept is the removal of nitrogen from the combustion stream by using oxygen as an oxidant rather than air. However, the mechanics of 100% oxy-fuel firing on, for example, large float glass furnaces have not yet been demonstrated and extraordinary operating costs, for example, the cost of oxygen use, associated with such a conversion remains to be a major impediment.

U.S. Pat. No. 4,403,941 teaches a combustion process for reducing $NO_x$ in combusters in which combustion takes place successively forming an incomplete combustion zone, a reducing combustion zone, and a complete combustion zone, respectively, corresponding to primary burners, secondary burners, and air ports or afterburners, successively arranged in the direction of gas stream in a furnace. U.S. Pat. No. 3,890,084 teaches a staged combustion process for reducing burner exhaust emissions in which burners in a vertically lower burner bank are initially fired with insufficient combustion air and burners in an upper burner bank are fired with additional combustion air to make up for the air deficiency of the lower burners, and, thus, provide all of the combustion air required for complete combustion of the fuel from the lower and upper burner banks.

SUMMARY OF THE INVENTION

Accordingly, it is an object of this invention to provide a process and apparatus for combustion of a fuel in a regenerative type industrial melting furnace which reduces the level of $NO_x$ emissions compared to known firing techniques.

It is another object of this invention to provide a combustion process and apparatus for reduction of $NO_x$ emissions which is retrofitable, cost effective, and which, at the same time, improves flame luminosity, shape, length and overall coverage over the melting material.

These and other objects of this invention are achieved by an in-line process for combustion of fuel and oxidant in which a first portion of fuel to be burned is mixed with an oxidant, forming a fuel-lean fuel/oxidant mixture in a fuel-lean combustion zone. The remaining portion of fuel is then mixed with the fuel-lean fuel/oxidant mixture downstream of the fuel-lean combustion zone, forming a substantially stoichiometric fuel/oxidant mixture. The substantially stoichiometric fuel/oxidant mixture is then ignited, forming a primary flame.

More particularly, in an industrial furnace comprising a combustion preheat means for preheating combustion air, a combustion chamber, and combustion air port means for transporting preheated combustion air from the combustion preheat means to the combustion chamber, the process in accordance with one embodiment of this invention comprises introducing a first portion of fuel into the combustion air port means and mixing the first portion of fuel with combustion air flowing from the combustion air preheat means to the combustion chamber, thereby forming a fuel-lean fuel/air mixture in the combustion air port means. The remaining portion of said fuel is then mixed with the fuel-lean fuel/air mixture proximate the exit end of the combustion air port means, that is, the end of the combustion air port means through which the combustion air enters the combustion chamber, forming a substantially stoichiometric fuel/air mixture. The substantially stoichiometric fuel/air mixture is then ignited, forming a primary flame within the combustion chamber.

An industrial material heating furnace for implementation of the process of this invention comprises a combustion air preheat means for preheating combustion air, a combustion chamber, at least one combustion air port connecting the combustion air preheat means to the combustion chamber and providing communication therebetween, primary injection means for introducing a first portion of fuel into the combustion air port, and secondary injection means for introducing the remaining portion of fuel into the combustion chamber, the secondary injection means disposed downstream of the primary injection means, connected either to the combustion air port or a wall of the combustion chamber, proximate the exit end of the combustion air port.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
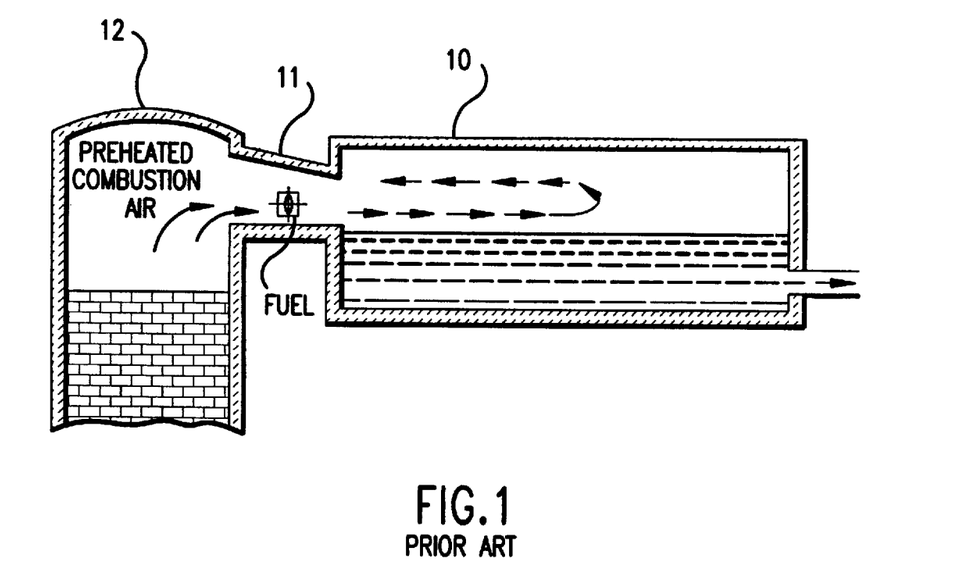
FIG. 1 is a longitudinal section of an endport glass melting furnace.
Figure 2:
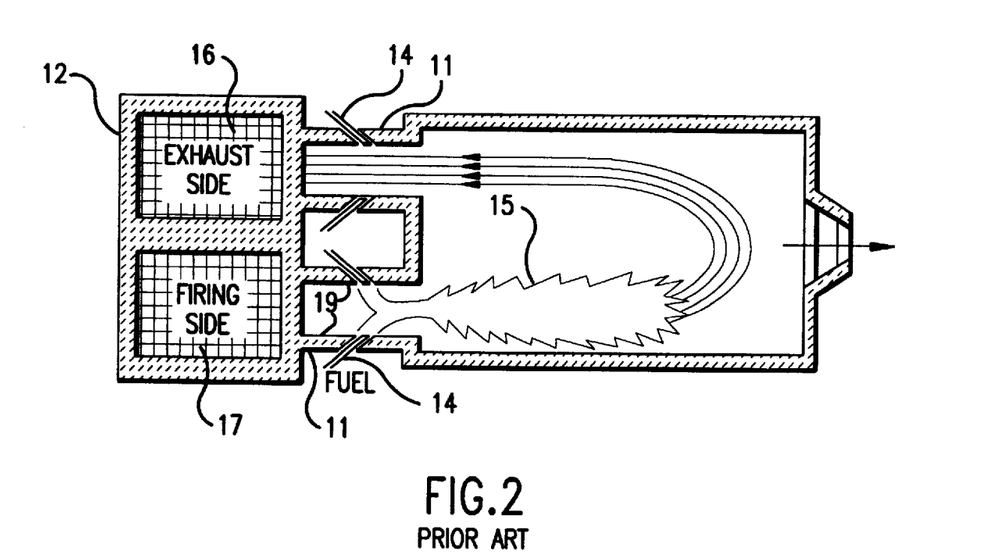
FIG. 2 is a plan view of an endport glass melting furnace.

Most industrial melting furnaces are of a regenerative type. In the glass melting industry, there are two common types, endport furnaces and side-fired furnaces. FIG. 1 shows a longitudinal view of an endport regenerative furnace comprising a melter/combustion chamber (10), regenerator (12), and combustion air port (11) connecting regenerator (12) to combustion chamber (10) and providing for the communication of preheated combustion air from regenerator (12) into combustion chamber (10). FIG. 2 shows a plan view of the endport melting furnace shown in FIG. 1. As can be more clearly seen from FIG. 2 regenerator (12) comprises two sides, an exhaust side (16) and a firing side (17). Fuel is fired from burners (14) disposed in port side wall (19) of port (11) disposed between firing side (17) of the regenerator and combustion chamber (10), mixing with preheated combustion air from the firing side (17) of the regenerator to form flame (15). The combustion products are then exhausted through a second port (11) into exhaust side (16) of the regenerator. As shown, the products of combustion have a U-shape. In order to provide even heating within combustion chamber (10), firing reverses periodically to the other port. That is, exhaust side (16) becomes firing side (17) and firing side (17) becomes exhaust side (16). Periodic firing enables the regenerator to store heat when the combustion products are exhausted through the exhaust side (16) of the regenerator and, when the firing within the melting furnace is reversed, to withdraw heat from the heated regenerator for preheating combustion air.

Figure 3:
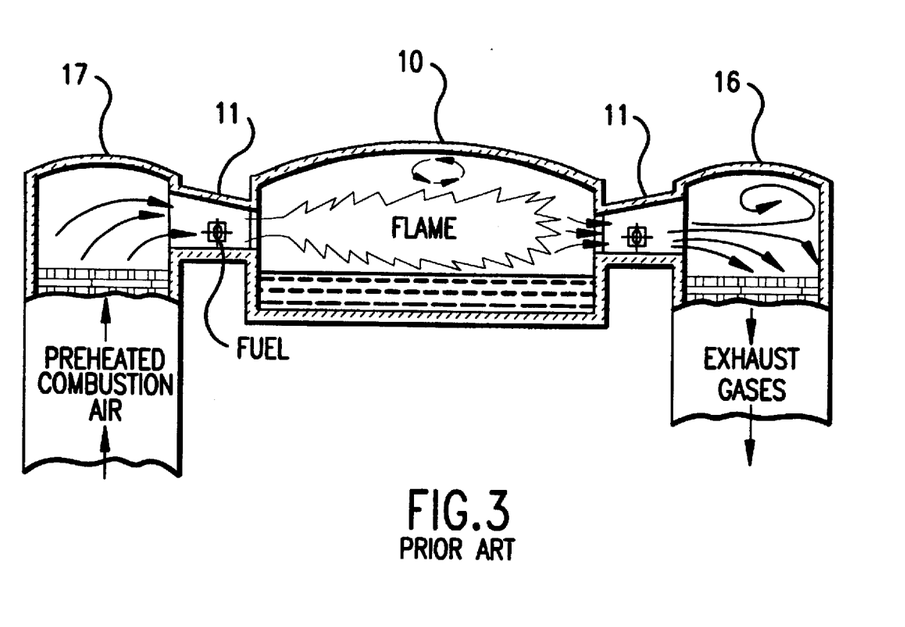
FIG. 3 is an end view of a sideport glass melting furnace.
Figure 4:
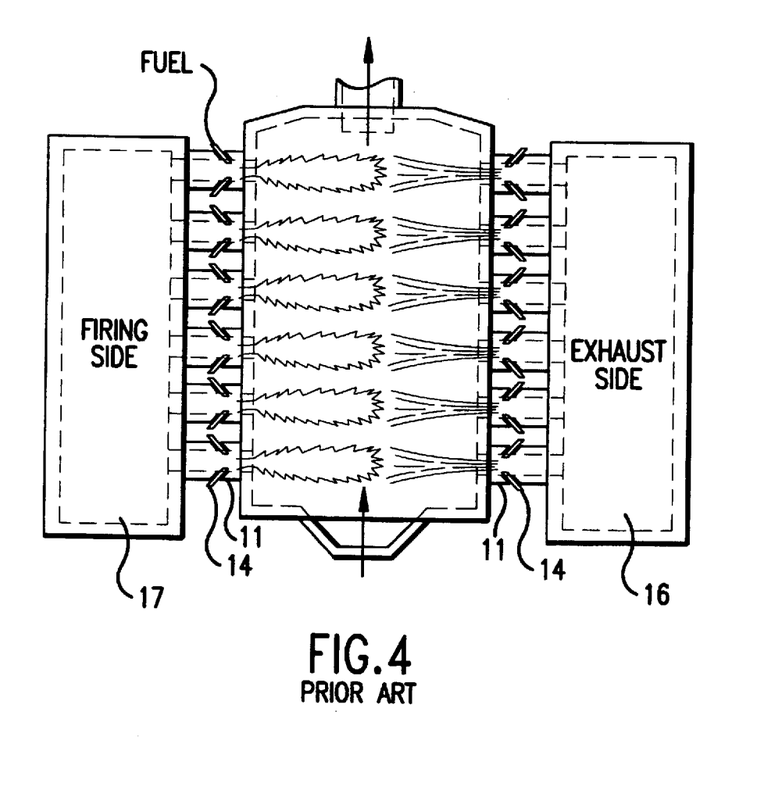
FIG. 4 is a plan view of a sideport glass melting furnace.

FIGS. 3 and 4 show an end-view and a plan view of a sideport glass melting furnace typical of the industry. In contrast to the endport furnace design shown in FIGS. 1 and 2, where both of the firing side (7) and exhaust side (16) are disposed at one end of the furnace, firing side (17) and exhaust side (16) are disposed on opposite sides of melter/combustion chamber (10). The sideport glass melting furnace comprises a plurality of firing ports and an equal number of exhaust ports on the opposite side of the combustion chamber (10). Fuel and preheated combustion air are fired from firing side (17) on one side of the combustion chamber (10) to exhaust side (16) on the opposite side of combustion chamber (10). As in the case of the endport fired furnace, the firing side is alternated periodically, thereby enabling the regenerators to store heat or preheat combustion air, as the case may be.

Figure 5A:
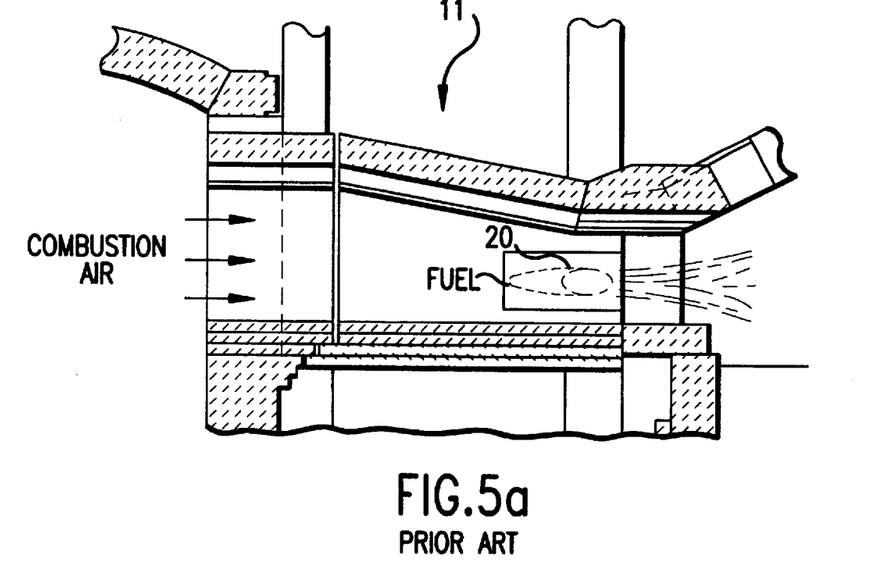
FIGS. 5(a)–5(e) illustrate different methods of firing in glass melting furnaces, FIG. 5(a) illustrating side-of-port firing, FIG. 5(b) illustrating overport firing, FIG. 5(c) illustrating underport firing, FIG. 5(d) illustrating through-port firing, and 5(e) illustrating side-of-port with baffle.

FIGS. 5(a)–5(e) illustrate traditional firing methods for both endport and sideport regenerative furnaces. For clarity, both combustion air direction and fuel jets are shown. FIG. 5(a) illustrates side-of-port firing, where side-of-port burners (20) are disposed in the port side wall, resulting in the introduction of fuel jets on both sides of port (11) at a certain angle. Typically the firing angle is between 20° and 40° to the port side walls (or flow axis). Incoming combustion air from the regenerator gradually mixes with the fuel jets and creates a flame in the melter, for example, as shown in FIG. 4. Side-of-port firing as shown in FIG. 5(a) is very common in most high capacity float glass furnaces, using natural gas as the preferred fuel.

Figure 5B:
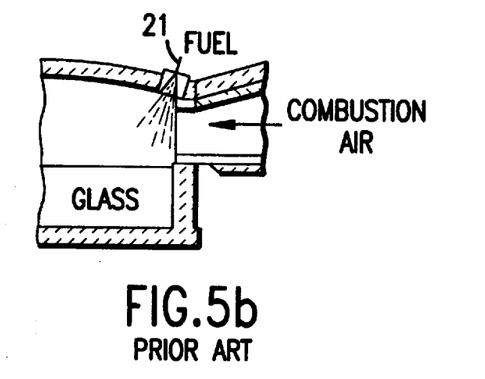
Figure 5C:
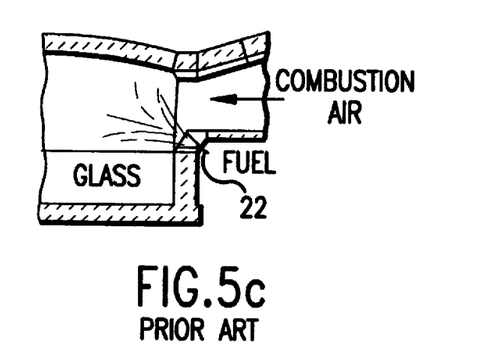

An alternative method of firing, overport firing is shown FIG. 5(b) where overport burner (1) is positioned proximate the combustion chamber roof or crown. However, maintenance or service of burners and burner block is very difficult at this location. Yet another method of firing, underport firing, is shown in FIG. 5(c) where the underport burner (22) is disposed below the bottom of port (11). In this way, fuel is introduced at an angle of approximately 6° to 8° upward to the preheated combustion air flowing through the port into the combustion chamber. A major benefit of underport firing is lower mixing rates between fuel and combustion air streams which produces longer flames, and thus more uniform coverage of the molten material, and lower $NO_x$ emissions.

Figure 5D:
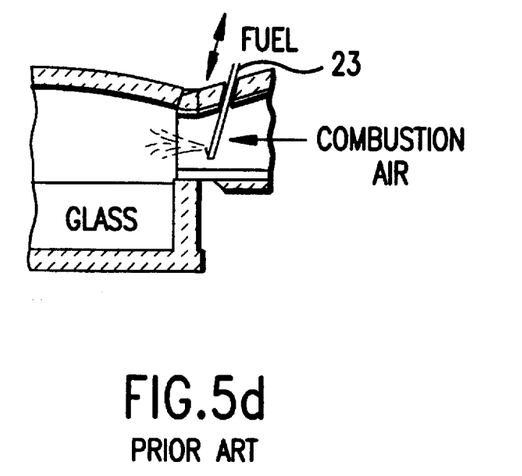
Figure 5E:
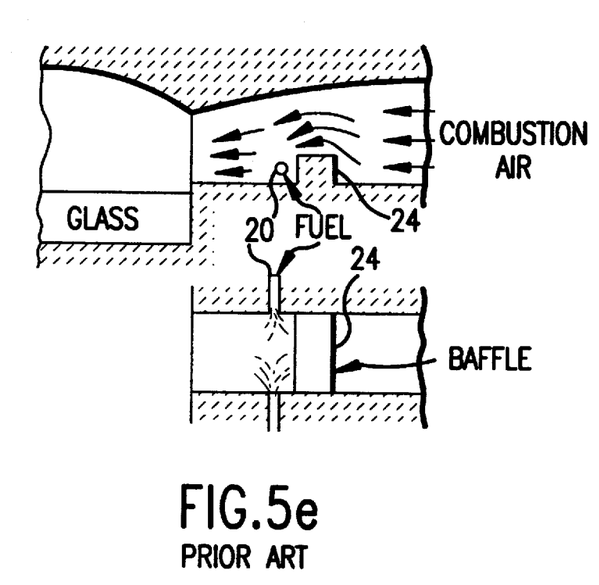

FIG. 5(d) illustrates a through-port firing technique where water-cooled through-port burner (23) is introduced through the roof of the port, as shown, or through the port bottom, at a slight angle. This type of firing is common with fuel oil firing and in situations where a larger flame coverage is desired. Finally, FIG. 5(e) illustrates another form of side-of-port firing where fuel is introduced just downstream of a refractory baffle. The baffle geometry creates a combustion air shadow region near the fuel inlet. Absence of adequate combustion air in this region promotes a fuel-rich combustion. Usually, flames are much longer and have lower momentum due to delayed mixing characteristics.

Figure 6A:
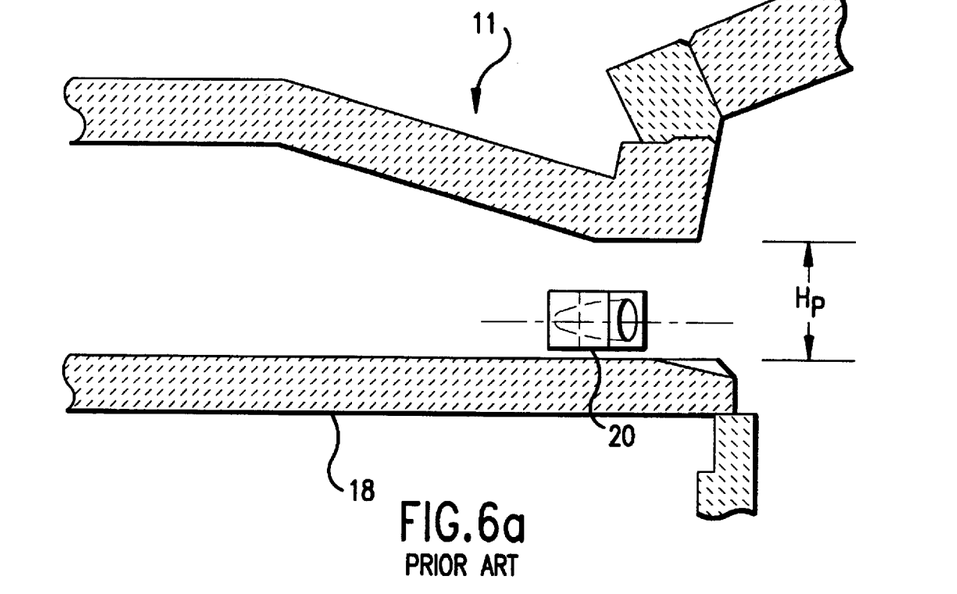
FIGS. 6(a) shows a side view of a port utilizing side-of-port firing.
Figure 6B:
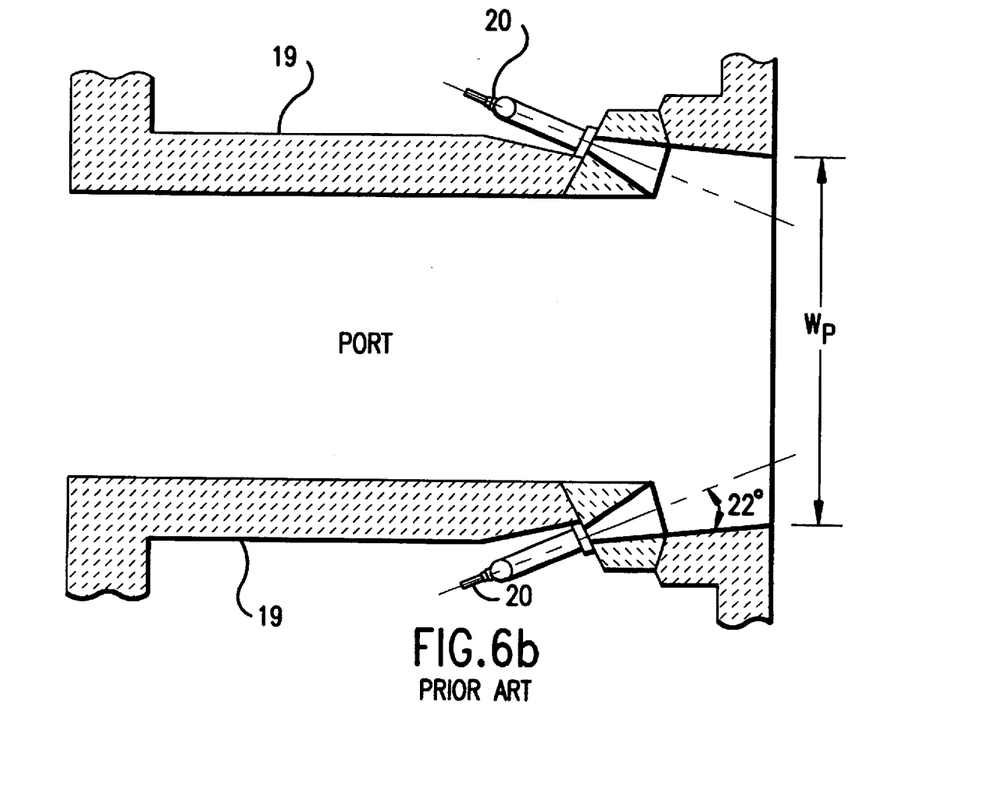
FIG. 6(b) shows a plan view of the port shown in FIG. 6(a)

The particular firing method used in a given installation is determined after careful analysis of furnace and port design, type of furnace, type of fuel, total firing rate per port, and flame length and shape requirements. The general objective for firing is to achieve, as near as possible, continuous coverage of the flame over the melting material. One common change in natural gas fired port design in recent years has been a significant widening of the ports. With side-of-port burners firing into a wider airstream, combustion initiation of the two flames is farther apart so that a wider overall flame is created, thereby improving flame coverage over the melting material surface. However, the preference for natural gas firing typically is to decrease the firing angle of burners (20) with respect to the incoming combustion air In a typical side-of-port firing as shown in FIGS. 6(a)–6(b). This results in reduced turbulence as the natural gas enters the airstream, which, in turn, delays combustion and provides a more even distribution of heat across the melter width. This, too, also results in an even wider flame with less non-heating space between the ports.

Figure 7A:
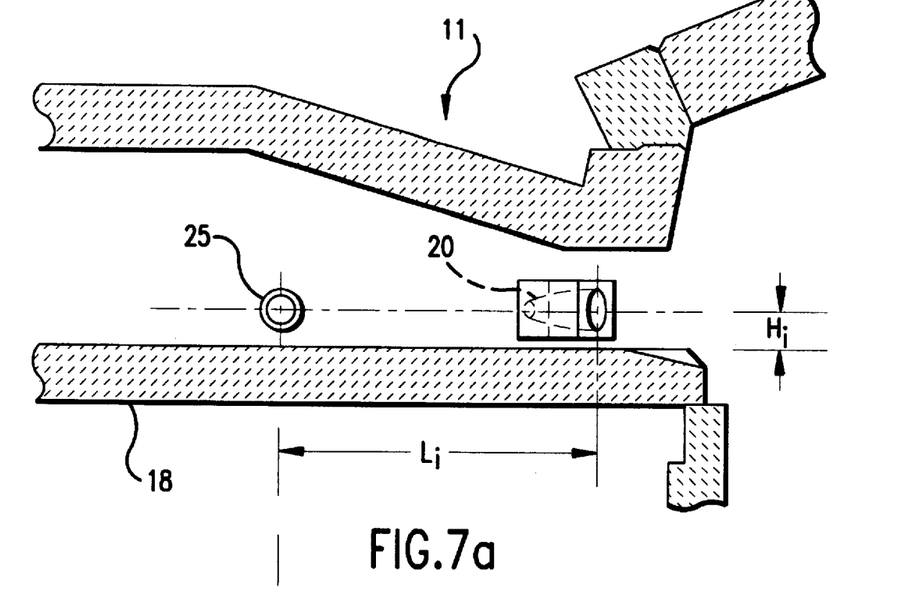
FIG. 7(a) shows a side elevation view of a port utilizing an in-line burner in accordance with one embodiment of this invention.
Figure 7B:
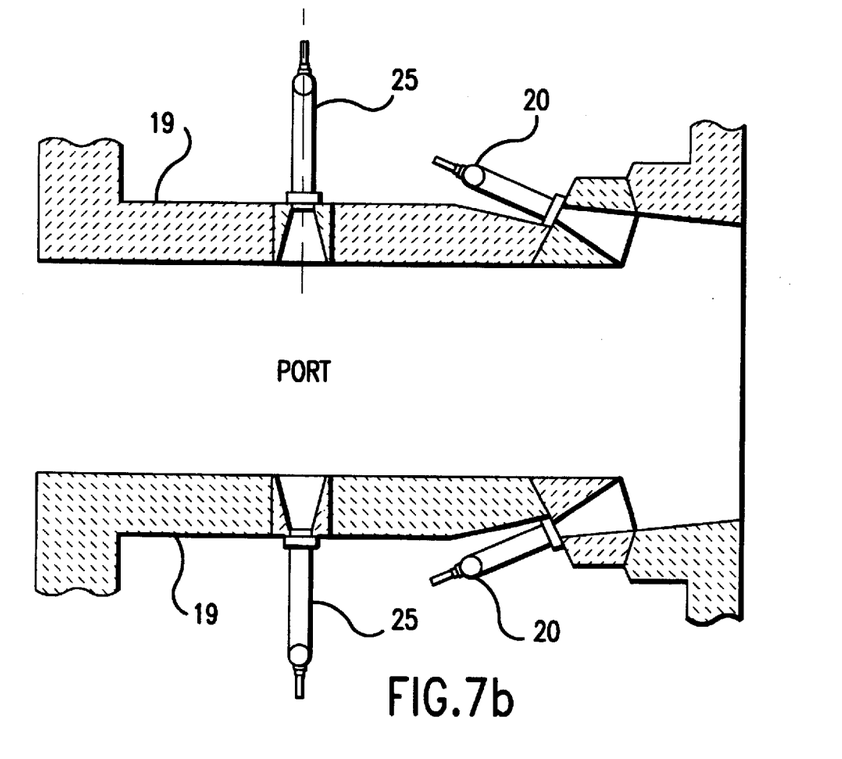
FIG. 7(b) shows a plan view of the port shown in FIG. 7(a)

The invention disclosed herein is a retrofitable process and apparatus for firing which reduces $NO_x$ emissions cost-effectively and at the same time improves flame luminosity, shape, length and overall coverage over the melting material. The process of this invention is referred to as an "in-line method" of firing, the apparatus for which is shown in FIGS. 7(a) and 7(b). The primary burners are shown as typical side-of-port burners (20). A second set of burners, "in-line" burners (25) are installed at a predetermined location (coordinates) on port side wall (19) and with respect to side-of-port burners (20). In-line burners (25) are disposed upstream of side-of-port burners (20) by a predetermined distance, $L_i$. $L_i$ is defined as the separation distance between exit center lines of side-of-port burners (20) and in-line burners (25) as shown in FIG. 8.

Figure 8:
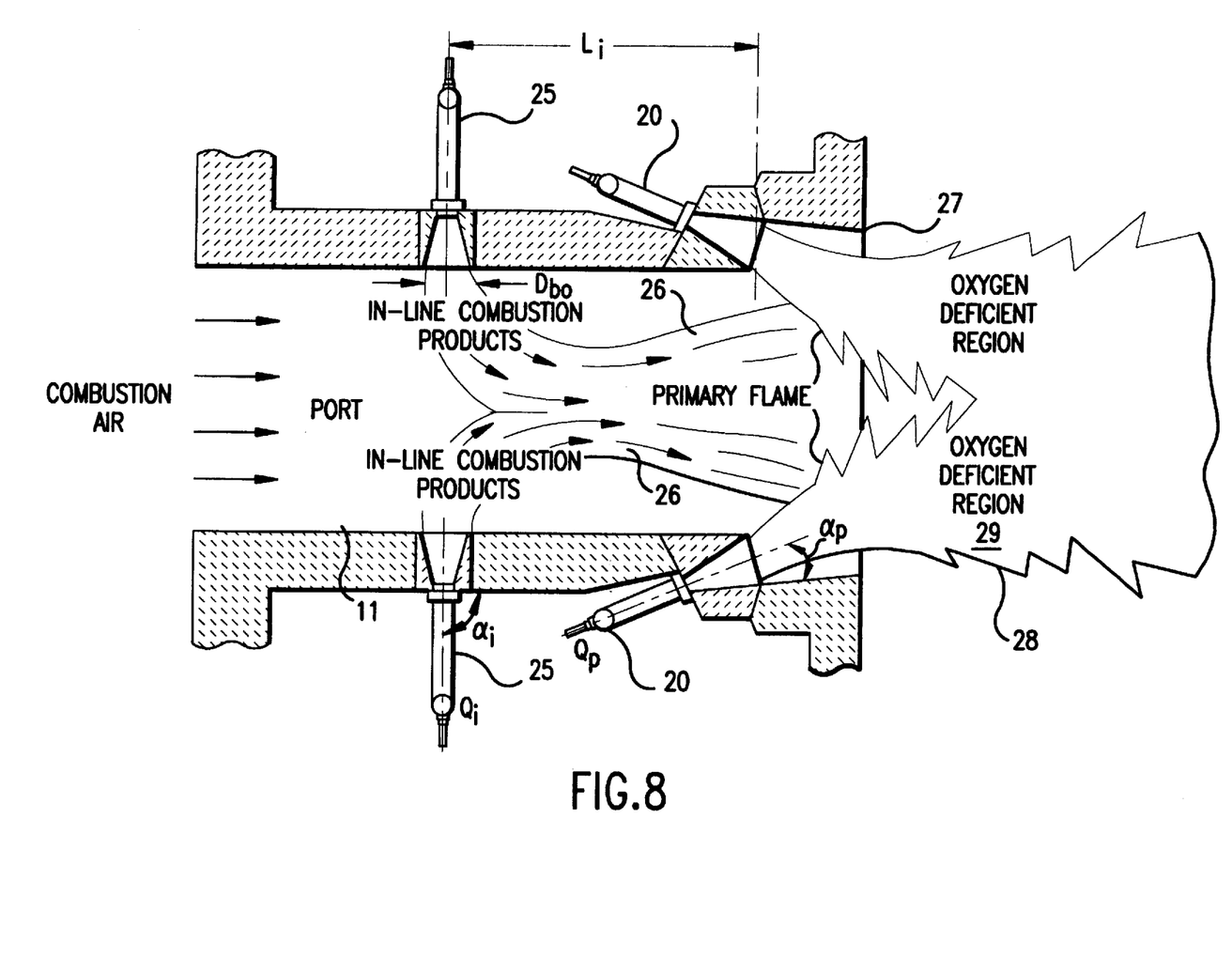
FIG. 8 shows a plan view of a port having in-line burners and showing the effects of implementation of the process of this invention.

Side-of-port burners (20), as show n in FIG. 8, fire at an angle $\alpha_p$, which for a side-of-port firing method varies between 20° to 40° depending on the port and furnace design. Wider ports, such as may be found in float glass furnaces, utilize an angle $\alpha_p$ in the range of about 20° to 22°. This matches very well with a high port aspect ratio (port width/port height) as seen in such float glass furnaces. For purposes of this discussion, fuel flow rate through side-of-port burner (20) is denoted by $Q_p$.

As shown in FIG. 7, in-line burner (25) is located at an upstream distance $L_i$ from the exit center line of side-of-port burner (20) and it is mounted at a height $H_i$ from the port bottom (18). In accordance with a particularly preferred embodiment, in-line burner (25) is installed on port side walls (19) in an opposed firing configuration as shown in FIG. 7(b).

Figure 9:
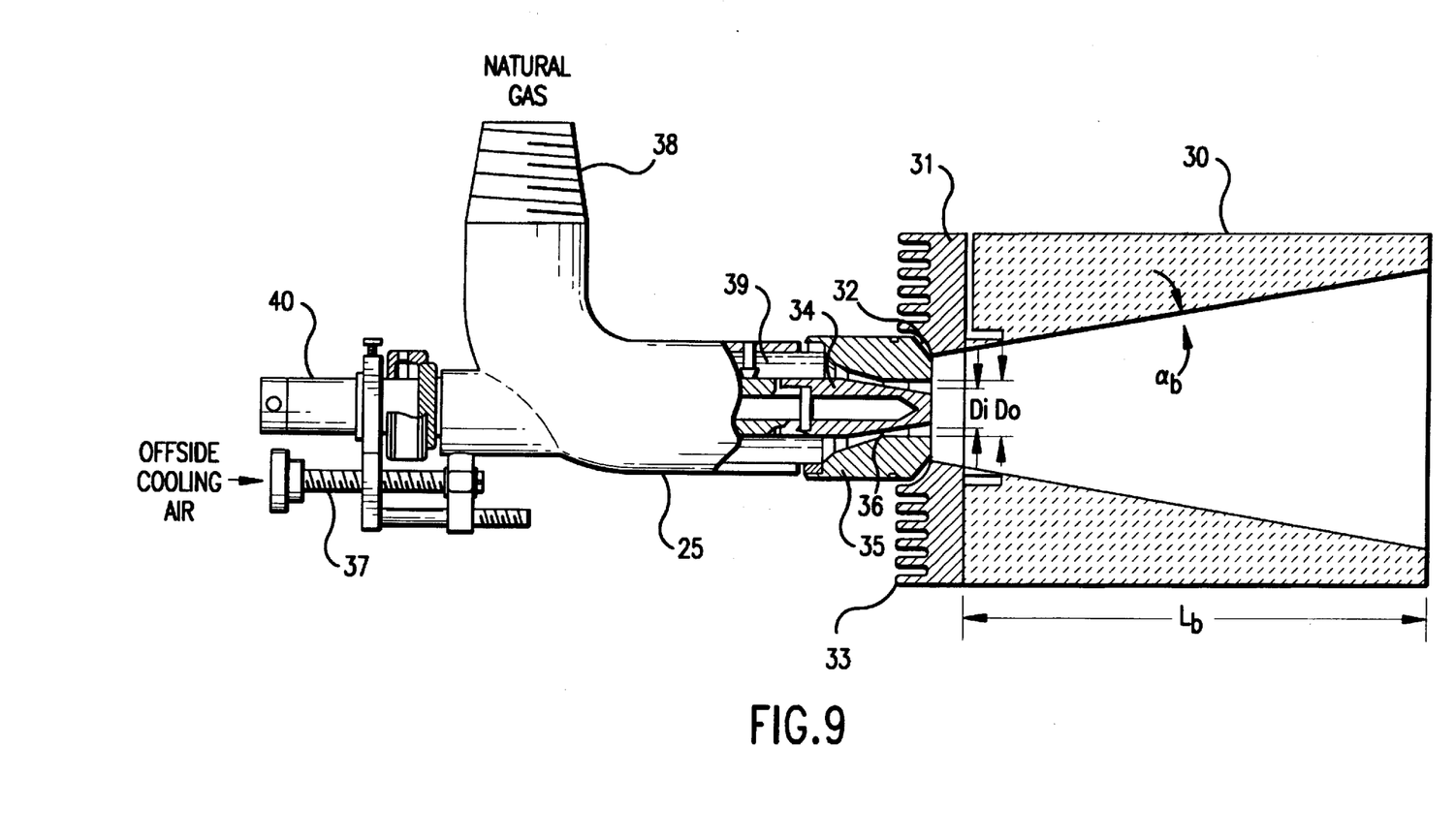
FIG. 9 is a detailed drawing of an in-line burner and burner block assembly in accordance with one embodiment of this invention.

In-line burner (25) is of a special design and utilizes a special refractory block (30) as shown in FIG. 9. A metallic transition plate or "socket plate" (31) provides a good seal between the furnace environment and outside conditions. Socket plate (31) also helps in adjusting the burner firing angle with respect to the axial flow direction. A rounded ball-type contact region (32) in socket plate (31) enables tilting and alignment of the burner in all 360° directions for firing purposes. Fins (33) on the surface of socket plate (31) allow heat to dissipate from socket plate (31) to the ambient environment by convection.

In-line burner (25) comprises an adjustable orifice (36) as shown in FIG. 9. Screw-type adjustment mechanism (37) at the rear end of in-line burner (25) enables the fuel flow exit area to vary in cross-section and, thus, vary the fuel flow velocity. The exit cross-section is of annular shape and can be varied by axial movement of the tapered air-cap (34) inside the converging-diverging gas tip (35) as shown in FIG. 9. Natural gas enters from a larger pipe (38) and flows in an annular region (39) before discharging from burner tip (35) at a velocity determined by the position set on screw-type mechanism (37).

Off-side cooling air is required during the regenerative furnace cycle when the burners on a given port are not firing. As shown in FIG. 9, cooling air enters center air tube (40) from the rear of in-line burner (25) and exits air-cap (34) with a predetermined swirl to keep the burner cool and the burner block purged with cooling air. This prevents furnace hot-gases from inspirating into the burner block. During the regular firing cycle, the flow of cooling air is interrupted.

FIG. 8 shows a general schematic diagram of the in-line combustion process in accordance with this invention. Primary burners (20) supply a fuel flow $Q_p$ in the range of about 50 to 95% of the total fuel in the port, whereas in-line burners (25) provide the remaining 5 to 50% of the total port fuel flow. Primary burners (20) fire at an angle $\alpha_p$ to the port center line, whereas, in accordance with one preferred embodiment, in-line burners (25) fire at an angle $\alpha_i$ equal to about 90° to port side wall (19). The products of combustion from in-line burners (25) mix with incoming combustion air inside port (11) and then proceed in a streamline fashion towards the fuel streams exiting primary burners (20). At this point, the incoming combustion air stream, having mixed with the products of combustion from in-line burners (25), is diluted in oxygen concentration. The level of dilution, or oxygen-deficiency, varies depending upon the amount of fuel fired by in-line burners (25) compared to primary burners (20). The formation of an oxygen-deficient zone (29) in the initial primary flame zone inhibits $NO_x$ formation and, at the same time, provides a flame with increased flame luminosity and coverage above the melt surface. The increase in primary flame luminosity is due to the localized fuel-rich combustion in the oxygen-deficient region (29). The $NO_x$ formation rate in the primary flame is reduced due to lack of oxygen availability in the primary flame-core. The coordinates of in-line burner (25), firing rate distribution, and its velocity are crucial for optimum $NO_x$ reduction and flame characteristics.

Use of an adjustable orifice in-line burner enables the formation of an in-line flame for optimum dilution of the primary flame with combustion products. At the same time, use of lower, and adjustable, fuel injection velocity by in-line burner (25) reduces the possibility of $NO_x$ generation due to undesirable mixing between the in-line fuel and combustion air.

Depending on the aspect ratio, $W_p/H_p$, of combustion air port (11), primary fuel flow rate, $Q_p$, physical limitations, and $NO_x$ reduction desired, a design for in-line burner (25) which provides the required flow rate, $Q_i$, velocity, $V_i$, firing angle, $\alpha_i$, in-line location coordinates, $L_i$, $H_i$, and in-line burner block design, $\alpha_b$, can be determined. Table 1 shows in-line burner dimensional parameter ranges for operation with various glass furnace port designs. The fuel velocity adjustability feature on in-line burner (25), specific in-line burner block geometry, and location coordinate ratios give enough flexibility to create a sufficiently oxygen-deficient primary flame condition necessary for required $NO_x$ reduction. The in-line fuel ratio, $Q_i/Q_p$, is varied automatically during the operation to match the operational changes in primary fuel rate, $Q_p$.

TABLE 1

IN-LINE BURNER DIMENSIONAL PARAMETER RANGES

| IN-LINE FUEL RATIO ($Q_i/Q_p$) | IN-LINE FUEL FLOW RATE, $Q_i$ (SCFH) | IN-LINE FUEL VELOCITY, V, (FT/S) | IN-LINE BURNER ORIFICE AREA, $A_o$ (SQIN) | FIRING ANGLE ($\alpha_i$) | IN-LINE DIST RATIO ($L_i/W_p$) | IN-LINE HEIGHT RATIO ($H_i/H_p$) | PORT ASPECT RATIO ($W_p/H_p$) | IN-LINE BURNER BLOCK DIVERGENCE ($\alpha_b$) | $NO_x$ REDUCTION RANGE (%) |
|---|---|---|---|---|---|---|---|---|---|
| 0.05–0.5 | 1000–10,000 | 30–180 | 0.222–13.33 | 60°–160° | 0.5–2.0 | 0.15–0.50 | 1–5 | 5° 15° | 5–50 |

NOMENCLATURE:
$Q_i$ = IN-LINE FUEL FLOW RATE (SCFH)
$V_i$ = IN-LINE FUEL VELOCITY (FT/SEC)
$Q_p$ = PRIMARY FUEL FLOW RATE (SCFH)
$\alpha_i$ = IN-LINE BURNER FIRING ANGLE W.R.T. PORT WALL (DEG.)
$L_i$ = SEPARATION DISTANCE BETWEEN THE PRIMARY AND IN-LINE BURNER EXIT CENTERLINES (FT)
$W_p$ = FIRING PORT WIDTH AT EXIT (FT)
$H_p$ = FIRING PORT HEIGHT AT EXIT (FT)
$A_o$ = IN-LINE BURNER ANNULAR ORIFICE AREA [=$\Pi/4\,(D_o-D_i)$](SQIN) WHERE $D_o$ IS BURNER TIP INSIDE DIAMETER AND $D_i$ IS AIR CAP OUTSIDE DIAMETER The in-line burner arrangement of this invention can be easily applied to other traditional firing methods as shown in FIGS. 5(b), 5(c), 5(d) and 5(e). The only difference is that the coordinate location, $L_i$, $H_i$, for in-line burner (25) may change due to the location of primary burner (20). The underlying process of mixing the in-line combustion products with the primary fuel stream still remains as a major requirement. A computer fluid dynamic modeling can be performed by those skilled in the art on individual ports to determine the optimum coordinate location for in-line burner (25). In certain poll designs having very short overall length, in-line burner (25) can be installed at an angle of $\alpha_i>90°$, or in other words, directed against the combustion air stream to provide better diffusion before dilution with the primary fuel stream.

while in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An industrial material heating furnace comprising:
   combustion air preheat means for preheating combustion air;
   a combustion chamber;
   at least one combustion air port connecting said combustion air preheat means to said combustion chamber and providing communication therebetween;
   primary injection means for introducing a first portion of a fuel into a combustion air stream flowing through said at least one combustion air port and forming a primary flame, said primary injection means connected to said at least one combustion air port; and
   secondary injection means for introducing a remaining portion of said fuel into said combustion chamber and forming an oxygen deficient zone proximate said primary flame, said secondary injection means disposed in a same horizontal plane as said primary injection means at a distance from a bottom of said at least one combustion air port downstream of said primary injection means and connected to one of said at least one combustion air port and a wall of said combustion chamber, proximate an exit end of said at least one combustion air port.

2. An industrial material heating furnace in accordance with claim 1, wherein said primary injection means comprises at least one in-line burner nozzle secured to a wall of said at least one combustion air port in at least one of a side-of-port configuration and a through-port configuration, and said secondary injection means comprises at least one primary burner nozzle secured to one of a wall of said at least one combustion air port and a combustion chamber wall in at least one of a side-of-port configuration, an overport configuration, an underport configuration and a through-port configuration proximate said exit end of said at least one combustion air port.

3. An industrial material heating furnace in accordance with claim 2, wherein the exit centerlines of said at least one in-line burner nozzle and said at least one primary burner nozzle are in the same horizontal plane at a distance from a bottom of said at least one combustion air port.

4. An industrial material heating furnace in accordance with claim 2, wherein said at least one in-line burner is disposed substantially perpendicular to said side wall of said at least one combustion air port.

5. An industrial material heating furnace in accordance with claim 2, wherein said primary injection means comprises a plurality of said in-line burner nozzles, said in-line burner nozzles disposed opposite each other in opposing side walls of said at least one combustion air port.

6. An industrial material heating furnace in accordance with claim 5 further comprising a plurality of said combustion air ports, each said combustion air poll comprising a plurality of said in-line burner nozzles.

7. An industrial material heating frniace in accordance with claim 6, wherein each of said in-line burner nozzles is secured to said combustion air port side walls by a socket plate, said socket plate forming a rounded ball cavity on a side facing said in-line burner nozzle, whereby an exit end of said in-line burner nozzle is rotatable in said rounded ball cavity.

8. An industrial material heating furnace in accordance with claim 7, wherein each of said in-line burner nozzles comprises cooling means for cooling said in-line burners when said in-line burners are not being fired.

* * * * *